(12) United States Patent
Kawai et al.

(10) Patent No.: US 7,215,687 B2
(45) Date of Patent: May 8, 2007

(54) UP-CONVERSION OPTICAL FIBER LASER APPARATUS

(75) Inventors: Kiyoyuki Kawai, Kyungki-do (KR); Jae Chul Yong, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 11/436,631

(22) Filed: May 19, 2006

(65) Prior Publication Data

US 2006/0263020 A1    Nov. 23, 2006

(30) Foreign Application Priority Data

May 19, 2005    (KR) .................. 10-2005-0042092

(51) Int. Cl.
*H01S 3/30* (2006.01)
*H01S 3/00* (2006.01)
(52) U.S. Cl. .................. 372/6; 372/99; 359/341.3
(58) Field of Classification Search ............. 372/6, 372/70, 75, 99, 102; 359/341.3
See application file for complete search history.

(56) References Cited

U.S. PATENT DOCUMENTS

2004/0028091 A1* 2/2004 Baev et al. .................. 372/6
2004/0240043 A1* 12/2004 Demidov et al. .......... 359/341.1

OTHER PUBLICATIONS

T. Sandrock et al., "High-Power Continuous-Wave Upconversion Fiber Laser at Room Temperature", Optics Letters, Jun. 1997, vol. 22, No. 11, pp. 808-810.

* cited by examiner

*Primary Examiner*—Hemang Sanghavi
(74) *Attorney, Agent, or Firm*—McDermott Will & Emery LLP

(57) ABSTRACT

The invention provides an optical fiber laser apparatus. In the invention, an excitation light source outputs light of a given wavelength. A first optical fiber generates light of a plurality of wavelengths including light of a first wavelength by up-conversion from the output light. Also, a first resonator includes first and second mirrors provided on both ends of the first optical fiber, respectively. The first resonator selects the first wavelength light to output via the second mirror. Further, a second optical fiber amplifies an output of the first wavelength light incident from the first resonator. In addition, the first and second mirrors have higher reflexivity for the first wavelength light than the second wavelength light having higher gain per length of the optical fiber. The first fiber has a length set such that the first wavelength light oscillates preferentially over the second wavelength light.

10 Claims, 5 Drawing Sheets (a)

(b)

(a)

(b)

US 7,215,687 B2

UP-CONVERSION OPTICAL FIBER LASER APPARATUS

CLAIM OF PRIORITY

This application claims the benefit of Korean Patent Application No. 2005-42092 filed on May 19, 2005 in the Korean Intellectual Property Office, the disclosure of which is incorporated herein by reference.

BACKGROUND OF THE INVENTION

1. Field of the Invention

The present invention relates to an optical fiber laser apparatus, more particularly to an up-conversion optical fiber laser apparatus for generating a stable and high-efficient laser beam of a given wavelength.

2. Description of the Related Art

Recently, broad-ranging areas of displays and optical recording devices have witnessed an increasing demand for a laser emitting short wavelength light such as green or blue light. However, disadvantageously, the short wavelength laser involves a difficult manufacture process and a high cost compared to a long-wavelength laser emitting infrared ray or red light.

Therefore, studies have been actively conducted on a manufacturing technique of a laser apparatus for generating short wavelength light from a relatively cheap long-wavelength laser. In a related conventional technology, an up-conversion fiber laser apparatus is disclosed in document "High-power continuous wave up-conversion fiber laser at room temperature" (T.Sandrock and et al., Optics letters Vol. 22, No. 11, Jun. 1, 1997).

The document teaches an optical fiber laser apparatus 10 including an excitation light source 13 having an input light of 830 nm, and an optical fiber 15 having a core 5 doped with rare earth ions of $Pr^{3+}$ and $Yb^{3+}$, as shown in FIG. 1(a).

In the optical fiber laser apparatus 10 shown in FIG. 1(b), the excitation light source 13 includes a titan sapphire laser device 11 and a condensing device 12 such as a lens or collimator. An output light of the laser device 11 becomes incident on the core 5 or a clad layer of the optical fiber 15 through the condensing device 12.

In the optical fiber 15, as shown in FIG. 1a, the core 5 doped with $Pr^{3+}$ and $Yb^{3+}$ is enveloped by first and second clad layers 4a and 4b. In the optical fiber 15, as shown in FIG. 2, with about 830 nm light incident from the excitation light source 13, electrons of $Yb^{3+}$ are excited from a ground level of $^2F_{7/2}$ and then transit to an energy level of $^2F_{5/2}$. At this time, when the electrons are relaxed to the ground level of $^2F_{7/2}$, the energy is transferred to $Pr^{3+}$ near $Yb^{3+}$ exciting electrons of $Pr^{3+}$ from a ground level of $^3H_4$ to an energy level of $^1G_4$. In addition, excitation light of 830 nm is directly absorbed into $Pr^{3+}$, exciting the electrons to an energy level of $^3P_0$. With the electrons relaxed from the excited level, 635 nm red light can be obtained by transition from $^3P_0$ to $^3F_2$ and 520 to 530 nm green light can be generated by transition from $^3P_0$ to $^3H_5$.

Light of 635 nm or 520 to 530 nm wavelengths obtained thereby, as shown in FIG. 1b, resonates between first and second mirrors 16a and 16b of a resonator 17 to oscillate into a laser beam of each wavelength. In general, red light (e.g., 635 nm) exhibits higher gain efficiency than green light (e.g, 520 nm), and thus has a laser oscillation threshold lower than green light. The aforesaid optical fiber laser apparatus oscillates red light of 635 nm due to its preferential oscillation over green light of 520 nm.

Therefore, in order to selectively output a desired low wavelength out of a plurality of light emitting variations, reflectivity properties of a mirror constituting Fabry-perot should be adjusted. That is, to suppress red light emission and oscillate green light in the optical fiber laser apparatus, first and second mirrors are required to have low reflectivity (preferably almost 0%) for 635 nm wavelength and high reflectivity (preferably almost 100%) for 520 to 530 nm wavelength.

However, typically, the mirror cannot ensure a high level of selectivity for the wavelength. Thus, just an adjustment in reflectivity of the mirror hardly enables a desired low wavelength to be selected for oscillation, and still less rarely guarantees a high output. Especially, in case of a small difference in wavelengths as in 635 nm red light and 520 to 530 nm green light, just an adjustment in reflectivity of the mirror hardly allows oscillation of a desired wavelength light.

SUMMARY OF THE INVENTION

The present invention has been made to solve the foregoing problems of the prior art and it is therefore an object of the present invention to provide an optical fiber laser apparatus which suppresses oscillation of a wavelength with high gain and oscillates a desired wavelength with low gain by adjusting reflectivity of a mirror and length of the optical fiber, and enhances output efficiency via additional optical fiber.

According to an aspect of the invention for realizing the object, there is provided an optical fiber laser apparatus comprising: an excitation light source for outputting light of a given wavelength; a first optical fiber having an end connected to an output of the excitation light source, and having a core doped with a rare earth substance to generate light of a plurality of wavelengths including light of a first wavelength by up-conversion from the output light; a first resonator including first and second mirrors provided on both ends of the first optical fiber, respectively, the first resonator selecting the first wavelength light out of the light of the wavelengths resonating in the first optical fiber between the first and the second mirrors to output via the second mirror; and a second optical fiber having an end connected to the other end of the first optical fiber, the second optical fiber amplifying an output of the first wavelength light incident from the first resonator, wherein light of wavelengths other than the first wavelength light comprises light of a second wavelength having higher gain per length of the optical fiber than the first wavelength light, wherein the first and second mirrors have higher reflexivity for the first wavelength light than for the second wavelength light, and wherein the first optical fiber has a length set such that the first wavelength light oscillates preferentially over the second wavelength light.

The length is determined by reflectivity ratio of the mirrors for the respective wavelength, excitation degree of the optical fiber by the excitation light and loss of the resonator in the respective wavelength.

Preferably, the first mirror has a reflectivity of 99% or more for the first wavelength light to ensure almost total reflection and the second mirror has a reflectivity of 80% or more for the first wavelength light to ensure the first wavelength light to oscillate stably. But the second mirror has reflectivity smaller than that of the first mirror.

In a detailed embodiment, the first optical fiber has a core doped with $Pr^{+3}$ and $Yb^{+3}$. At this time, a semiconductor laser device of the excitation light source comprises an infrared ray laser having an output wavelength of 800 to 1000 nm. The light of the wavelengths generated from the doped core comprises the first wavelength light and light of a second wavelength having higher gain than the first wavelength light. The first wavelength light may be green light having a wavelength of 520 to 530 nm, and the second wavelength light may be red light having a wavelength of 635 nm.

The first wavelength light generated from the first resonator according to the invention oscillates stably at a low threshold, however, with a limited output. To overcome this, according to the invention, a second optical fiber is added to increase an output of the first wavelength light. This can be realized through the following two embodiments.

According to one embodiment of the invention, the second optical fiber is a general optical fiber amplifier. According to another embodiment of the invention, the optical fiber laser apparatus further comprises an injection locking type second resonator including the second mirror and a third mirror. The second resonator comprises the second mirror commonly connected to the first resonator and the third mirror provided on the other end of the second optical fiber. This structure adopts a principle of an injection locking laser which amplifies only a wavelength corresponding to the first wavelength light injected from the second mirror. The third mirror has relatively lower reflectivity of preferably 4 to 30%, and more preferably about 10%.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 1:
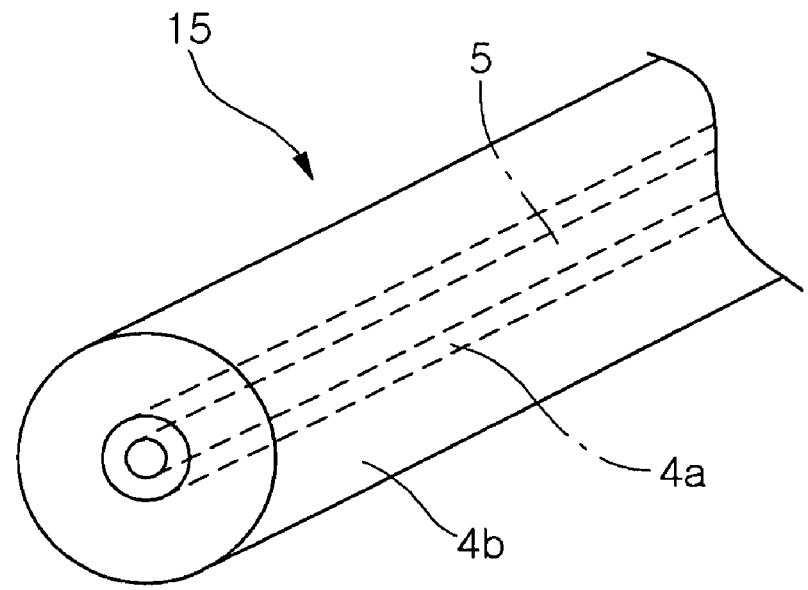
FIGS. 1 (a) and (b) illustrate a double-cladding optical fiber having a core doped with $Pr^{3+}$ and $Yb^{3+}$ and an optical fiber laser apparatus using the same, respectively, according to the prior art.
Figure 1:
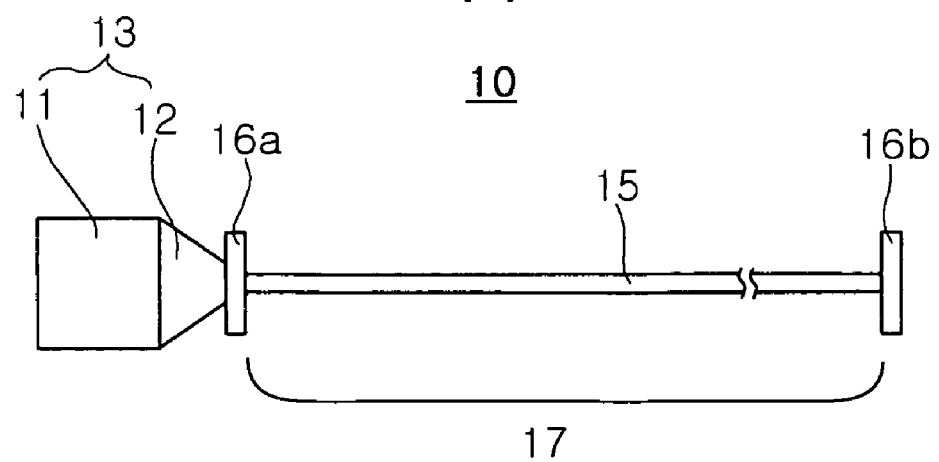
Figure 2:
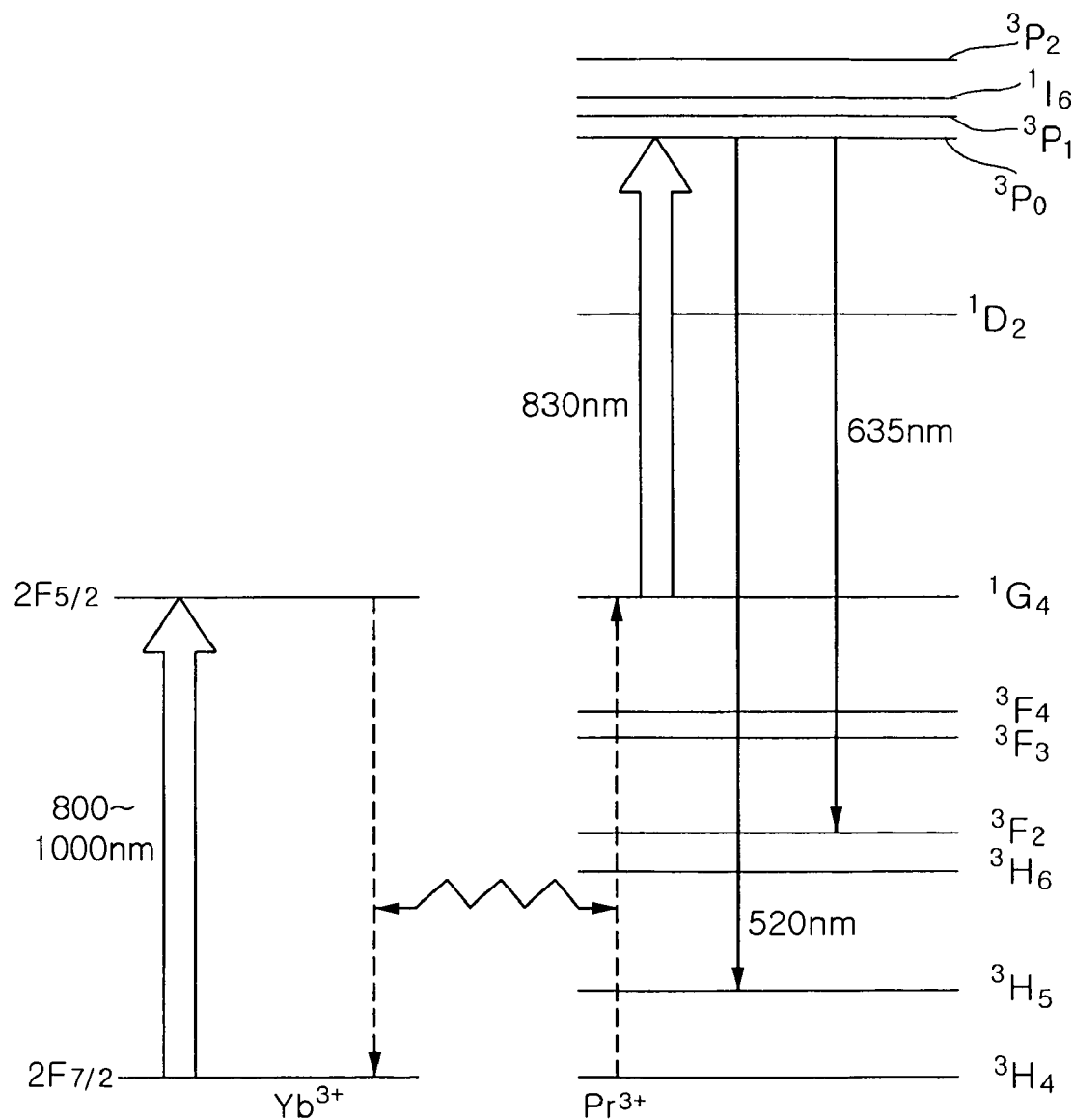
FIG. 2 illustrates energy levels of $Pr^{3+}$ and $Yb^{3+}$ for explaining a basic principle of the optical fiber laser apparatus of FIG. 1(b)
Figure 3:
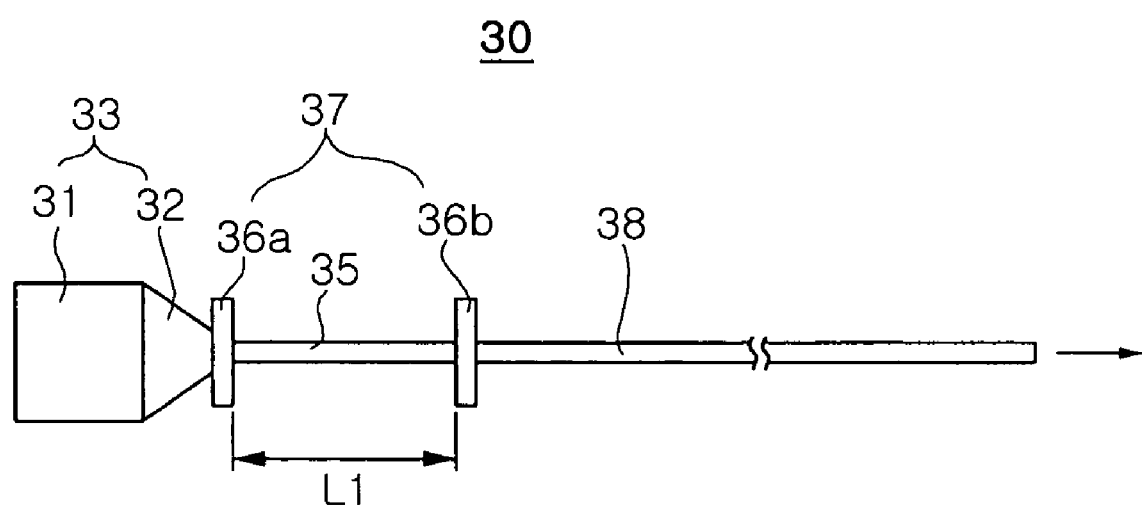
FIG. 3 illustrates an optical fiber laser apparatus according to one embodiment of the invention.

FIG. 3 is an optical fiber laser apparatus 30 according to one embodiment of the invention.

Referring to FIG. 3, the optical fiber laser apparatus 30 includes an excitation light source 33, a first resonator 37 having a first optical fiber 35 and a second optical fiber 38 for amplifying light.

The excitation light source 33 includes a semiconductor laser device 31 and a condensing device 32 such as a lens or collimator capable of focusing light outputted from the semiconductor laser device 31 onto a core or a clad of the first optical fiber 35.

The first optical fiber 35 has a core appropriately doped with rare earth ions such that a desired first wavelength light can be generated from the output light of the laser device 31 light by up-conversion. The rare earth ions doped allow the output light of the laser device 31 to oscillate into a plurality of wavelengths (e.g. a second wavelength) including the first wavelength.

The first resonator 37 includes a first mirror 36a provided at one end of the first optical fiber 35 and a second mirror 36b provided at the other end of the first optical fiber 35. In the first resonator 37, the first and second mirrors 36a and 36b have high reflectivity HR for the first wavelength light such that a desired first wavelength light is oscillated at a low threshold to output via the second mirror. The second mirror 36b has lower reflectivity than the first mirror 36a. Preferably, the first mirror 36a has high reflectivity substantially the same as total reflectivity. Preferably, the first mirror 36a has a reflectivity of 99% or more for the first wavelength light. Preferably, the second mirror 36b has a reflectivity of 80% or more (more preferably, 90% or more) for the first wavelength light.

Meanwhile, according to the invention, the desired first wavelength light has gain lower than that of the second wavelength light. For example, in case where a doped rare earth element is $Pr^{3+}$, in the same energy level, green wavelength light (520 to 530 nm) has lower gain per unit length of the optical fiber than blue wavelength light (635 nm). Therefore, in the invention, in order to selectively oscillate the first wavelength light with low gain such as green wavelength light, the first and second mirrors 36a and 36b have relatively high selectivity for the first wavelength light. The first and second mirrors 36a and 36b may be a dichronic mirror. Also, the first fiber 35 needs to have its length L1 reduced adequately such that the first wavelength light can be oscillated preferentially over the second wavelength light based on wavelength selectivity of the first and second mirrors 36a and 36b. Detailed explanation will be given in FIGS. 4(a) and 4(b) regarding a principle of adjusting the length of the first optical fiber to ensure selectivity of the first wavelength light according to the invention.

To suppress other wavelength light having higher gain but preferentially oscillate the first wavelength light, the length L1 of the first optical fiber 35 needs to be reduced. But this leads to decrease in output, hardly ensuring high conversion efficiency. Therefore, according to the invention, the second optical fiber 38 is connected to the other end of the first optical fiber 35 to increase the output of the first wavelength light.

As in this embodiment, the second optical fiber 38 may be a general optical fiber amplifier. The second optical fiber 38 serves to amplify the first wavelength light incident from the second mirror 36b. Amplification is also generated by up-conversion, and the second optical fiber 38 can be excited commonly by the excitation light source 33.

In this fashion, according to the invention, the length of the first fiber 35 is shortened in the resonator 37 including first and second mirrors 36a and 36b having relatively higher reflectivity than the first wavelength light. Therefore, the first wavelength light with relatively lower gain per unit length is subject to preferential oscillation, and then the output of the wavelength light is amplified through the optical fiber amplifier 38, thereby giving excellent conversion efficiency to the optical fiber laser apparatus 30.

Figure 4:
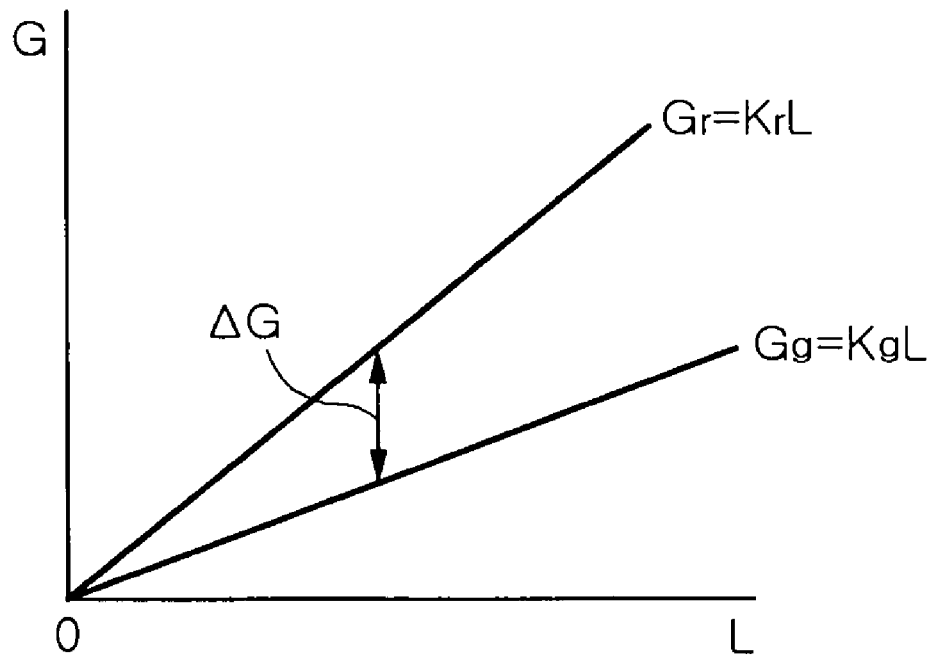
FIGS. 4 (a) and (b) are graphs illustrating a principle of a first resonator of the optical fiber laser apparatus according to the invention.
Figure 4:
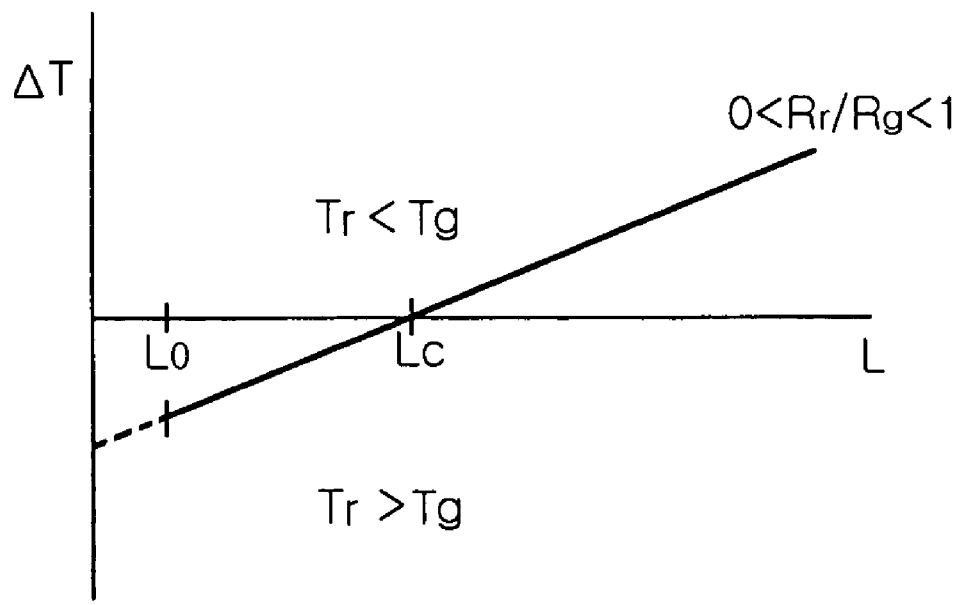

FIGS. 4(a) and (b) are graphs for explaining the principle employed n a first resonator of an optical fiber laser apparatus according to the invention. The graphs can be explained with respect to a structure similar to FIG. 3, in which wavelengths of 635 nm and 520 to 530 nm are oscillated, respectively, in case of using an optical fiber doped with $Pr^{3+}/Yb^{3+}$ and an excitation light source having a wavelength of 830 nm.

On the assumption that the first and second mirrors have a reflectivity of 99.9% and 90.0%, respectively, at a wavelength of 520 to 530 nm, and an up-conversion optical fiber (i.e., first optical fiber) is excited equally for total lengths, each wavelength light has gain in accordance with the length L1 of the first optical fiber as follows:

Gr=KrL1

Gg=KgL1, where Kr is gain per unit length for light of 635 nm wavelength, and Kg is gain per unit length for light of 520 to 530 nm wavelength, respectively.

Also, since Kr is larger than Kg in $Pr^{3+}$, gain for the respective wavelength is illustrated as in the graph of FIG. 4(a). That is, gain Gr for 635 nm wavelength is larger than that Gg for 520 to 530 nm wavelength, with a difference in gains ΔG increasing proportional to the length of the first optical fiber.

Therefore to inhibit light emission at a wavelength of 635 nm and enable light oscillation at a wavelength of 520 to 530 nm, both mirrors of the first resonator are required to have high reflectivity Rg for the wavelength of 520 to 530 nm and low reflectivity Rr (preferably 0%) for the wavelength of 635 nm. However, these mirrors are in fact rarely configurable. Especially, in case of a very small difference in both wavelengths as in the example, the selective preferential oscillation is hardly realized only with reflectivity selectivity of mirrors.

The mirrors can have Rr/Rg within a range of 0.1 to 0.5. As such, due to typical limitation in Rr/Rg, when it is assumed that wavelengths of 635 nm and 520 to 530 nm have an oscillation threshold designated with Tr and Tg, respectively, a relationship between oscillation thresholds Tr and Tg of the wavelengths and the length of the first optical fiber can be illustrated as in FIG. 4(b). Herein, $L_0$ denotes the minimum length of the optical fiber for oscillating.

That is, when the length of the first optical fiber is bigger than $L_c$, even despite wavelength selectivity of the mirrors, a bigger difference in gains between two wavelength lights lowers an oscillation threshold Tr for a wavelength of 635 nm, thus allowing a wavelength of 635 nm to oscillate preferentially. On the contrary, when the length of the first fiber is smaller than $L_c$, due to a small oscillation threshold Tg for a wavelength of 520 to 530 nm, light of a wavelength of 520 to 530 nm can oscillate preferentially.

Based on this principle, under the conditions that the mirrors have appropriate wavelength selectively, the length of the optical fiber is reduced to preferentially oscillate the first wavelength light having low gain.

Figure 5:
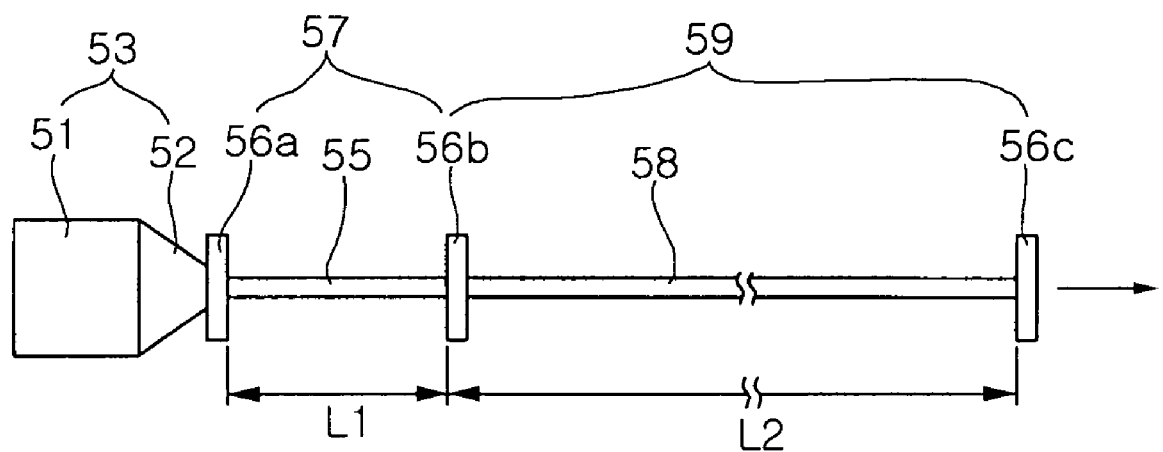
FIG. 5 is an optical fiber laser apparatus according to another embodiment of the invention.

FIG. 5 shows an optical fiber laser apparatus 50 according to another embodiment of the invention.

Referring to FIG. 5, the optical fiber laser apparatus 50 includes an excitation light source 53, a first resonator 57 having a first optical fiber 55 and a second resonator 59 having a second optical fiber 58 in the similar manner to FIG. 3. Also, the excitation light source 53 includes a semiconductor laser device 51 and a condensing device 52 such as a lens or collimator capable of focusing light outputted from the semiconductor laser device 51 into the first optical fiber 55.

The first optical fiber 55 has a core doped with rare earth ions such as $Pr^{+3}/Yb^{+3}$ to obtain a desired first wavelength from the laser output light. For example, when the semiconductor laser device 51 has an output wavelength of 810 to 850 nm, wavelengths of 635 nm and 520 to 530 nm may be oscillated from the core doped with $Pr^{+3}/Yb^{+3}$.

The first resonator 57 includes a first mirror 56a provided at one end of the first optical fiber 55 and a second mirror 56b provided at the other end of the first fiber 55. Preferably, the first mirror 56a has a reflectivity of 99% or more for a desired wavelength light to ensure almost total reflectivity, while the second mirror 56b has a reflectivity of 80% or more for the desired wavelength light. Also, the first and second mirrors 56a and 56b have a high selectivity for the desired wavelength light. For example, the first and second mirrors 56a and 56b have a reflectivity corresponding to a wavelength of 520 to 530 nm, which is higher than that of a wavelength of 635 nm.

With the first and second mirrors 56a, 56b, the first resonator 57 can oscillate the first wavelength light having high reflectivity at a low threshold and output the oscillated wavelength light via the second mirror 57.

In addition to wavelength selectivity of the mirrors, to ensure the first wavelength light having lower gain than the second wavelength light to oscillate preferentially, the length of the first optical fiber 55 needs to be reduced properly. The decrease in the length L1 of the first optical fiber 55 leads to preferential oscillation of the first wavelength light, however with a reduced output. To increase the lowered output of the first wavelength light, the second optical fiber 58 is connected to the other end of the first optical fiber 55.

In this embodiment of the invention, a third mirror 56c is provided on the other end of the second optical fiber 58 in order to construct the second mirror 56b and an additional second resonator 59 in the second optical fiber 58. By an injection locking laser principle, the second resonator 59 amplifies only wavelength corresponding to the first wavelength light injected from the second mirror 56b to output via the third mirror 56c. To ensure enough increase in the output, the third mirror 56c has a reflectivity of preferably 4 to 30%, and more preferably about 10% for the first wavelength light. Also, unlike the first optical fiber 55, the second optical fiber 58 has an enough length L2 in view of oscillation conditions for boosting efficiency. In this embodiment of the invention, structurally, the second optical fiber 58 is commonly excited by the excitation light source 53 but a separate excitation light source may be adopted for the second optical fiber 58.

In this fashion, according to the embodiment, the length L1 of the first optical fiber 55 is shortened in the first resonator 57 which includes first and second mirrors 56a, 56b having relatively high reflectivity for the first wavelength light. Thereby, the first wavelength light with relatively lower gain is oscillated preferentially, and then the low output of the wavelength light is amplified and elevated based on the injection locking laser principle employed in the second resonator 59. This allows the optical fiber laser apparatus 50 to have excellent conversion efficiency.

The optical fiber laser apparatuses as shown in FIGS. 3 and 5 have been shown and described with the separate first and second optical fibers. However, the first and second optical fibers may be parts of one optical fiber. In this case, the mirror may be a fiber grating mirror. The mirror includes but not limited to a dichronic mirror or an optical fiber grating mirror. Other types of mirrors satisfying reflectivity conditions of the invention may be employed.

Further, according to the invention, the first and second optical fibers each are selected from a group consisting of a single mode optical fiber, a multimode optical fiber, a double-cladding optical fiber and a polarization maintaining optical fiber.

While in the aforesaid embodiments, structurally, the first and second optical fibers are commonly excited by an excitation light source, each of the optical fibers may be excited by one or more excitation light sources independently. Such modifications into various well-known structures as just described shall also fall within the scope of the invention.

As stated above, according to the invention, the length of an optical fiber is adjusted to overcome limited selectivity of a mirror. This allows oscillation of short wavelength by inhibiting that of long wavelength more efficiently. Also, output efficiency is enhanced via an additional optical fiber, thereby ensuring an optical fiber laser apparatus to have high conversion efficiency.

While the present invention has been shown and described in connection with the preferred embodiments, it will be apparent to those skilled in the art that modifications and variations can be made without departing from the spirit and scope of the invention as defined by the appended claims.

What is claimed is:

1. An optical fiber laser apparatus comprising:
    an excitation light source for outputting light of a given wavelength;
    a first optical fiber having an end connected to an output of the excitation light source, and having a core doped with a rare earth substance to generate light of a plurality of wavelengths including light of a first wavelength by up-conversion from the output light;
    a first resonator including first and second mirrors provided on both ends of the first optical fiber, respectively, the first resonator selecting the first wavelength light out of the light of the wavelengths resonating in the first optical fiber between the first and the second mirrors to output via the second mirror; and
    a second optical fiber having an end connected to the other end of the first optical fiber, the second optical fiber amplifying an output of the first wavelength light incident from the first resonator,
    wherein light of wavelengths other than the first wavelength light comprises light of a second wavelength having higher gain per length of the optical fiber than the first wavelength light,
    wherein the first and second mirrors have higher reflexivity for the first wavelength light than for the second wavelength light, and
    wherein the first optical fiber has a length set such that the first wavelength light oscillates preferentially over the second wavelength light.

2. The optical fiber laser apparatus according to claim 1, wherein the first mirror has a reflexivity of 99% or more for the first wavelength light, and the second mirror has a reflexivity of 80% or more for the first wavelength light.

3. The optical fiber laser apparatus according to claim 1, wherein the first optical fiber has a core doped with $Pr^{+3}$ and $Yb^{+3}$.

4. The optical fiber laser apparatus according to claim 3, wherein the excitation light source includes a semiconductor laser device and a condensing device, and the laser device comprises an infrared ray laser having an output wavelength of 800 nm to 1000 nm.

5. The optical fiber laser apparatus according to claim 4, wherein the first wavelength light has a wavelength of 520 nm to 530 nm and the second wavelength light has a wavelength of 635 nm.

6. The optical fiber laser apparatus according to claim 1, wherein the second optical fiber is an optical fiber up-conversion amplifier.

7. The optical fiber laser apparatus according to claim 1, further comprising an injection locking type second resonator including the second mirror and a third mirror provided on the other end of the second optical fiber,
    wherein the second resonator amplifies only a wavelength corresponding to the first wavelength light injected from the second mirror by up-conversion and outputs the amplified wavelength via the third mirror.

8. The optical fiber laser apparatus according to 7, wherein the third mirror has a reflexivity of 4% to 30%.

9. The optical fiber laser apparatus according to claim 1, wherein the first optical fiber and the second optical fiber comprise one optical fiber, and the second mirror is an optical fiber grating mirror.

10. The fiber laser apparatus according to claim 1, wherein the first and second optical fibers each are selected from a group consisting of a single mode optical fiber, a multimode optical fiber, a double-cladding optical fiber and a polarization maintaining optical fiber.

* * * * *